(12) United States Patent
Monnet et al.

(10) Patent No.: US 8,215,704 B2
(45) Date of Patent: Jul. 10, 2012

(54) ACOUSTIC BAFFLE

(75) Inventors: Jean-Pierre Monnet, Boulleret (FR);
Fabrice Prunarety, St. Satur (FR);
Sébastien Peget, Saint Bouize (FR);
Gregory Magnet, St. Loup (FR)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/488,087

(22) Filed: Jun. 19, 2009

(65) Prior Publication Data
US 2011/0057392 A1   Mar. 10, 2011

Related U.S. Application Data

(63) Continuation of application No. PCT/EP2006/012568, filed on Dec. 8, 2006.

(51) Int. Cl.
*B62D 25/00* (2006.01)
(52) U.S. Cl. .............................. 296/187.02; 296/193.06
(58) Field of Classification Search ............ 296/187.02, 296/193.06, 39.3; 181/198; 428/99, 122, 428/139
See application file for complete search history.

(56) References Cited

U.S. PATENT DOCUMENTS

| | | | | |
|---|---|---|---|---|
| 5,373,027 A * | 12/1994 | Hanley et al. | ............. | 521/84.1 |
| 5,506,025 A * | 4/1996 | Otto et al. | ............. | 428/98 |
| 5,806,915 A * | 9/1998 | Takabatake | ............. | 296/187.02 |
| 6,053,564 A * | 4/2000 | Kamata et al. | ............. | 296/187.09 |
| 6,093,358 A * | 7/2000 | Schiewe et al. | ............. | 264/250 |
| 6,146,565 A * | 11/2000 | Keller | ............. | 264/46.5 |
| 6,150,428 A * | 11/2000 | Hanley et al. | ............. | 521/135 |
| 6,281,260 B1 * | 8/2001 | Hanley et al. | ............. | 521/135 |
| 6,382,635 B1 * | 5/2002 | Fitzgerald | ............. | 277/630 |
| 6,383,610 B1 * | 5/2002 | Barz et al. | ............. | 428/192 |
| 6,413,611 B1 * | 7/2002 | Roberts et al. | ............. | 428/99 |
| 6,419,305 B1 * | 7/2002 | Larsen | ............. | 296/203.03 |
| 6,649,243 B2 * | 11/2003 | Roberts et al. | ............. | 428/99 |
| 6,863,338 B2 * | 3/2005 | Stahl | ............. | 296/187.02 |
| 7,192,071 B2 * | 3/2007 | Watanabe et al. | ............. | 296/30 |
| 7,335,413 B2 * | 2/2008 | Ui et al. | ............. | 428/100 |
| 7,422,088 B2 * | 9/2008 | Ito | ............. | 181/198 |
| 7,494,179 B2 * | 2/2009 | Deachin et al. | ............. | 296/187.02 |

(Continued)

FOREIGN PATENT DOCUMENTS

DE          3838655 A1      5/1990

(Continued)

OTHER PUBLICATIONS

International Search Report dated Aug. 27, 2007, International Application PCT/EP2006/012568 All references cited in the International Search Report are listed above.

*Primary Examiner* — Glenn Dayoan
*Assistant Examiner* — Gregory Blankenship
(74) *Attorney, Agent, or Firm* — Mary K. Cameron

(57) ABSTRACT

A heat expandable baffle having a shape corresponding to, but smaller than, the shape of the cross section of a cavity to be sealed, and comprising a rigid support plate, a carrier for a heat expandable material and a heat expandable material mounted only to the outer periphery of the carrier. When activated by heating, the expandable material expand radially from the carrier to seal the cross sectional gap between the carrier and the cavity wall.

13 Claims, 3 Drawing Sheets

U.S. PATENT DOCUMENTS

| | | | |
|---|---|---|---|
| 7,913,467 B2 * | 3/2011 | Schneider et al. | 52/232 |
| 2004/0207233 A1 * | 10/2004 | Bock et al. | 296/187.02 |
| 2005/0279567 A1 | 12/2005 | Ito | |
| 2006/0041227 A1 | 2/2006 | Takabatake | |
| 2006/0043772 A1 * | 3/2006 | Richardson | 296/187.02 |

FOREIGN PATENT DOCUMENTS

| | | | |
|---|---|---|---|
| EP | 1593588 B1 | 1/2008 | |
| JP | 11254462 A | 9/1999 | |
| JP | 2000194378 A | 7/2000 | |
| JP | 2001079845 A | 3/2001 | |
| JP | 2002099281 A | 4/2002 | |
| JP | 2004252169 A | 9/2004 | |
| WO | 9937506 A1 | 7/1999 | |
| WO | 0003894 A1 | 1/2000 | |
| WO | 0171225 A1 | 9/2001 | |
| WO | 0183206 A1 | 11/2001 | |
| WO | 0192063 A1 | 12/2001 | |
| WO | 03004314 A1 | 1/2003 | |
| WO | 2005037608 A1 | 4/2005 | |

* cited by examiner

ACOUSTIC BAFFLE

CROSS-REFERENCE TO RELATED APPLICATIONS

This application is a continuation under 35 U.S.C. Sections 365(c) and 120 of International Application No. PCT/EP2006/012568, filed Dec. 28, 2006 and published in English on Jul. 10, 2008 as WO 2008/080415, which are incorporated herein by reference in their entirety.

FIELD OF THE INVENTION

The present invention relates to acoustically active and sealing baffles in the cavities of structural components of vehicles.

BACKGROUND OF THE INVENTION

Modern vehicle concepts and structural designs of vehicles have a plurality of cavities which have to be sealed in order to prevent the ingress of moisture and contaminants, since the latter can result in corrosion from the inside on the corresponding body parts. This applies, in particular, to modern self-supporting body constructions in which a heavy frame construction is replaced by so-called "space frames". With the latter, use is made of a lightweight, structurally solid chassis made of prefabricated hollow sections. Such constructions have, depending upon the specific system, a number of cavities which have to be sealed against the penetration of moisture and contaminants. These cavities include the upwardly extending A-, B- and C-pillars supporting the roof structure, the roof rail, portions of the fenders, or the sill. In addition, these cavities transmit airborne sound in the form of unpleasant vehicle running noises and wind noises, therefore such sealing measures also serve to reduce the noises and therefore to enhance the comfort of traveling in the vehicle. During the assembly of the car, these frame parts and body parts containing cavities are prefabricated from half-shell components which were joined at a later time by welding and/or adhesive bonding so as to form the closed hollow section. With such a type of construction the cavity in the early body in white ("body shop") state of a vehicle body is accordingly easily accessible, so that sealing and acoustically damping baffle parts (sometimes referred to as "pillar fillers" or "cavity filler inserts") can be fixed in this early phase of body construction by mechanical hanging, by insertion into appropriate holding devices, bores or by welding to the cavity walls.

Most modern baffles are designed to include a sealing material disposed on a support member or carrier. The carrier is generally manufactured from a rigid material, such as hard plastic, such that its shape approximates the shape of the cavity to be sealed. The carrier/sealing material combination is configured such that the carrier is inserted into a cavity, and the sealing material creates an airtight seal between the carrier and the walls of the cavity. Typically, the sealing material is activated (thermally or chemically) after insertion into the cavity so that the sealing material forms a seal with the walls of the cavity.

DE 3838655 A1 discloses a method for acoustic insulation of vehicle body cavities by using a commercially available polyurethane foam material which is to be saturated with an tacky plastic compound, so that after manual compression it bonds together briefly before re-expanding. This reference suggests to provide a bore in the cavity wall into a which a sleeve is being inserted. The continuation of this sleeve has sections which can swing open to form an outlet opening for the foam to expand into the cavity.

From WO 99/37506 a cavity sealing article is known which comprises a planar support member and a sealing member comprising a foamable polymer which surrounds in an intimate contact the support member and which is in plane with the support member. The foamable polymer comprises at least two layers which are in intimate contact and which are in the plane of the support member. The outer most layer of the sealing member comprises an uncross linked foamable polymer and the inner layer comprises a cross linked foamable polymer.

WO 00/03894 A1 discloses a lightweight expandable baffle for sealing a cavity of a vehicle body at a predetermined cross section of the cavity. This baffle includes a rigid support plate having an outer periphery with a shape generally corresponding to but smaller than the shape of the cross section of the cavity. Said baffle comprises a heat expandable sealing material mounted to the outer periphery of the rigid support plate having an activation temperature range at which the material expands. The support plate is being formed of a material having a higher melting point than the activation temperature range of the sealing material. When activated, the sealing material expands radially from the rigid support plate to fill the cross-sectional cavity between the rigid support plate and the cavity walls.

WO 01/83206 A1 discloses a combined baffle and reinforcing assembly for use within the cavity of a structural member to dampen acoustic transmissions through the cavity and to provide reinforcement in a direction transverse to the longitudinal axis of the structural member. The combined assembly includes a synthetic carrier which comprises an interior area, a marginal rim and an attachment member preferably in a form of a clip suited for insertion to the corresponding hole in the wall of the structural member. The carrier is circumscribed by a continuous band of reinforcing material extending around the periphery of the carrier. The marginal rim of the carrier may include a base wall and a support flange for receiving the thermally expandable material thereon.

WO 01/71225 describes an expandable baffle part for sealing cavities in automobiles. This part comprises a thermally expandable sealing material that is able to expand at the temperatures of the E-coat bake oven. Moreover, the baffle part comprises a support which positions and fixes the expandable material at the predetermined point in the cavity until the thermal expansion sets in. The support further has at least one clip or a snap-action or plug-in device which is inserted under pressure into a corresponding bore or aperture in the hollow-space structure in order to fix the component.

WO 03/004314 discloses a sound insulation device for mounting in a tubular part, in particular a motor vehicle body work part. This insulation device comprises a partitioning insert, a cord of a composition that is thermally expandable to form a foam, whereby the cord is fitted to the periphery of the insert. The device further comprises retaining means for holding the cord on the insert prior to expansion of the cord and means for encouraging the cord to expand towards the inside wall of the tubular part. It is suggested that the cord is formed by being extruded in rectilinear manner without any particular shaping and wherein the cord retaining means are integrally molded with the partitioning insert and also serve to shape the extruded cord around the periphery of the partitioning insert.

WO 2005/037608 A1 refers to an acoustic baffle for use in a cavity in a structural member. The baffle comprises a double walled support member, whereby the first wall is spaced a part from the second wall to define an acoustical gap of the predetermined dimensions between the two walls of the support member. An expandable sealing material is coupled with supported by at least apportion of the support member of the baffle to provide a localized sealing and sound separation to frames, rails, cavities, panels and other structural members of an automotive vehicle body.

JP2004-252169A discloses a sealing device for hollow structures with intricate sectional shape. The device comprises a first holder plate formed in correspondence to the cross sectional shape of the cavity of the hollow structure and a second holder plate holding a foamable base material between itself and the first plate. Only the one side face of the foamable base material is supported by the first plate in approximately the central region of the hollow chamber. Both side faces of the foamable base material are held by the first and the second plate and in a projected region which projects on the upper left of the peripheral edge of the hollow chamber.

US2006/0041227 A1 discloses a blocking device for mounting a blocking member and a fixing device within a space defined within a hollow structure of a car body. The blocking member may be disposed on one side of a wall portion extending within the space. The blocking member has an expandable member and a holder for holding the expandable member. The expandable member is expandable by heat to form a foam member. The fixing device has a fixing member that may be disposed on the other side of the wall portion within the space. The fixing device also has a connecting member that may extend through an insertion hole formed in the wall portion. The connecting member connects the blocking member to the fixing member.

While the above mentioned baffles have been successfully employed to seal automotive body cavities against the intrusion of dust, water, carbon monoxide and to a certain extent noise, a need exists for an improved baffle with enhanced sound suppression capability which can be manufactured in a simple and cost effective process.

SUMMARY OF THE INVENTION

The solution to this problem as provided by the invention is defined in the claims and consists essentially in providing a heat expandable baffle for sealing automotive cavities at a predetermined cross section of the cavity defined by cavity walls. The baffle comprises a rigid support plate with a shape corresponding to but smaller than the shape of the cross section of the cavity, a carrier for a heat expandable material and a heat expandable material mounted only to the outer periphery of the carrier the heat expandable material being adapted to expand at a temperature in the activation temperature range. When activated, the heat expandable material is expanding radially from the carrier to seal the cross sectional cavity between the carrier and the cavity wall.

In preferred embodiments, the rigid support plate is made of polyamide or sheet metal selected from steel, galvanized steel, aluminum or aluminum alloys. The carrier is preferably made from a thermoplastic material with a melting point above the activation temperature range. Preferred thermoplastics are polyamides, polyimides, polyoxypropylene or polyethylene terephthalate, most preferably the carrier is made of polyamide. The polyamide for making the carrier and/or the rigid support plate may contain fibers and/or inorganic fillers.

Preferably, the outer rim of the carrier has a flange in L-form which forms, together with the peripheral edge of rigid support plate, an U-shaped groove. This U-shaped groove is adapted to receive the heat expandable material. The side of the carrier facing the rigid support plate may include protruding fasteners for securing the carrier to the support plate. Advantageously, the support plate has boreholes adapted to receive the protruding pin like fasteners of the carrier.

Fastening devices may be attached to one or more peripheral areas of the support plate. Examples of preferred fastening devices are rivets, screws and especially push pins or protruding angular welding plates. The rigid support plate can be fixed to the inner side of the cavity walls of the car body by means of said fastening devices.

The heat expandable material can be made, for example, from ethylene/vinyl-acetate copolymers (EVA), copolymers of ethylene with (meth)acrylate esters, which optionally also contain (meth)acrylic acid incorporated proportionately by polymerization, random copolymers or block copolymers of styrene with butadiene or isoprene or the hydrogenation products thereof. The latter may also be tri-block copolymers of the SBS, SIS type or the hydrogenation products thereof SEBS or SEPS. In addition, the polymer compositions may also contain cross-linking agents, coupling agents, plasticizers as well as further auxiliary substances and additives. With a view to achieving a sufficient foaming capacity and expandability, these polymer compositions may also contain blowing agents. Suitable, in principle, by way of blowing agents are all known blowing agents such as, for example, the "chemical blowing agents" which release gases as a result of decomposition or "physical blowing agents", i.e. expanding hollow beads. Examples of the first-mentioned blowing agents are azobisisobutyronitrile, azodicarbonamide, dinitrosopentamethylenetetramine, 4,4'-oxybis(benzenesulfonic acid hydrazide), diphenylsulfone-3,3'-disulfohydrazide, benzene-1,3-disulfohydrazide, p-toluene-sulfonyl-semi-carbazide. Examples of the physical blowing agents are expandable plastic hollow microbeads based on polyvinylidene-chloride copolymers or acrylonitrile/(meth)-acrylate copolymers, such as are commercially available, for example, under the names "Dualite" and "Expancel" from Pierce & Stevens and Casco Nobel, respectively. Preferably, the heat expandable material has an activation temperature below 200° C.

As a rule, the thermally expandable (heat expandable) material completely surrounds the carrier and the rigid support plate and is preferably located in a U-shaped boundary or radial groove formed by the carrier flange and the rigid support plate. As a rule, the thermally expandable material protrudes from the open side of the U-shaped groove.

In the expanded and cured form, the heat expandable material has a damping factor of 0.2 to 1 and more.

The carrier is preferably made by injection molding. In preferred embodiments, the thermoplastic carrier and the heat expandable material are either formed in one co-extrusion process or in subsequent extrusion process on the same injection molding unit.

A other embodiment of the present invention comprises a process for sealing a cavity of a vehicle body at a predetermined cross section of the cavity defined by cavity walls. In a first step a heat expandable material is mounted only to the outer periphery of the carrier, said heat expandable material being adapted to expand in the activation temperature range. In a subsequent step, the combined carrier and heat expandable material are mounted to the rigid support plate and said carrier is fixed to the support plate. Next, the rigid support plate is mounted to one of the cavity walls in a transverse orientation to the cavity wall, leaving a small peripheral space between the sealing material and the inner side of the cavity walls. In the electro coat baking oven, the sealing material is being heated to a temperature in the range of the activation temperature, whereby the heat expandable material is sealing the peripheral gap between the carrier and the inner side of the cavity walls.

A preferred embodiment of the heat expandable baffles according to the present invention will now be explained in more detail with the aid of drawings.

DETAILED DESCRIPTION OF THE INVENTION

An automobile body typically includes several interconnected, hollow frame elements or "pillars" that define the passenger compartment, the engine compartment, the trunk, the door ways, the window openings and the wheel wells.

It is common in automotive engineering to refer to the pillars supporting the roof by letters with the front side pillars being "A" pillars, the middle side pillars being the "B" pillars and the rear side pillars being the "C" pillars, etc. Each of the hollow frame elements or pillars encloses a cavity. It is common practice to manufacture these hollow frame elements or pillars from two separate half shells.

Figure 1:
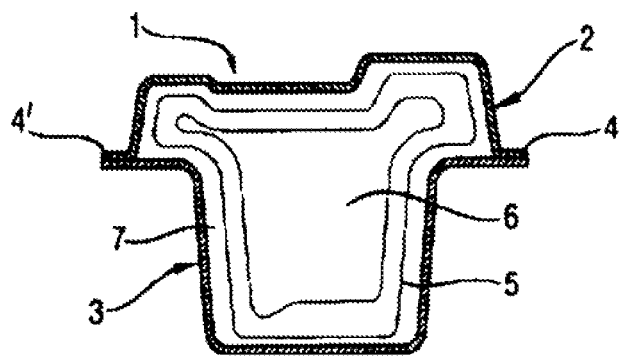
FIG. 1 is a simplified cross sectional view of an automobile cavity of a car body and a composite baffle disposed in the cavity.

A typical hollow frame element or pillar 1 has a cross-section as shown in FIG. 1, which includes the exterior wall consisting of half shell 2 and half shell 3 defining the cavity of the pillar. In the course of the assembly of the pillar, the half shell walls 2 and 3 are secured to one another by welding at the flanges 4 and 4'. Prior to the assembly, a composite baffle is secured by means of fasteners to half shell 2 or half shell 3 perpendicular to the longitudinal axis of the half shell. The composite baffle comprises a central portion 6, which is surrounded by an expandable material 5, leaving a space 7 between outer edge of the expanding material 5 and the inner side of the half shell 2 and 3.

Figure 2:
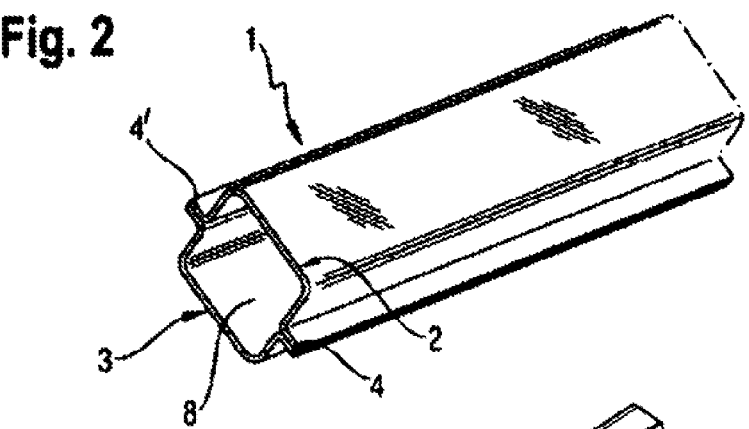
FIG. 2 is a perspective view of an automobile cavity in a pillar of a car body.

FIG. 2 shows a perspective view of typical pillar 1 consisting of the two half shells 2 and 3 being joined by welding at the flanges 4 and 4'. In this figure, the longitudinal cavity 8 is shown without a baffle in the inside.

Figure 3:
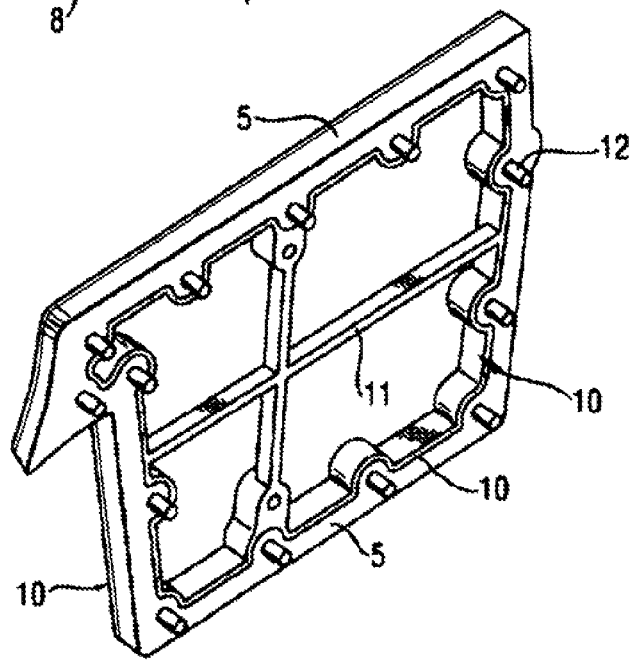
FIG. 3 is a perspective view of a rear side of a carrier of the heat expandable baffle that faces the rigid support plate in an assembled baffle according to the present invention.

The combined carrier 10 surrounded by the peripheral heat expandable sealing material 5 is shown in FIG. 3. In this Figure, for improved stability, the carrier 10 is supported in the interior area by cross-shaped lattice 11. The pin-like fastening devices 12 may be integrally molded with the carrier. These fastening devices permit an easy assembly of the carrier 10 with the rigid support plate. The heat expandable sealing material 5 is attached to the carrier 10 at the outer flange as a continuous bead with the fastening pins 12 protruding through the heat expandable material 5. The carrier is preferably made by injection molding. In preferred embodiments, the thermoplastic carrier and heat expandable material are either formed in one co-extrusion process or in subsequent extrusion processes on the same injection molding unit.

Figure 4:
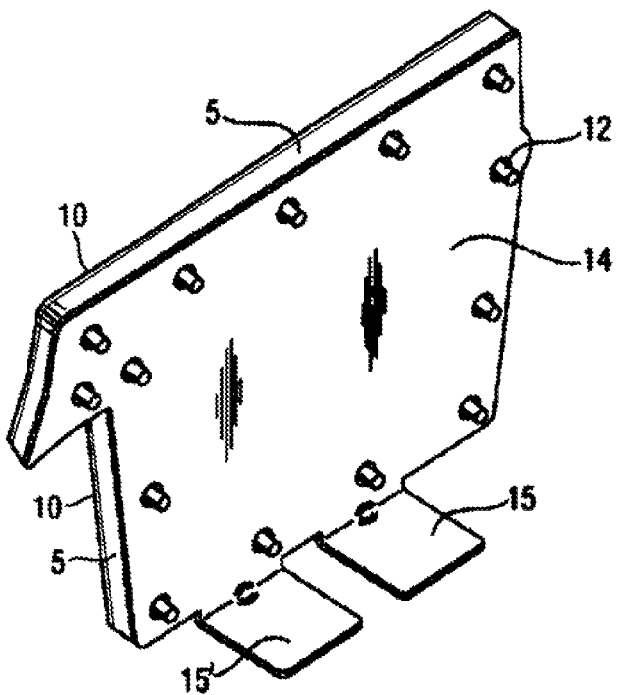
FIG. 4 is a perspective view of the rear side of an assembled heat expandable baffle according to the invention, the assembly including the rigid support plate, the carrier and the heat expandable material.

FIG. 4 shows the assembly of rigid support plate 14 with carrier 10 and heat expandable sealing material 5. Fastening pins 12 of carrier 10 are protruding through corresponding bore-holes of rigid support plate 14. Flanges 15 and 15' may be integrally attached to the lower edge of the rigid support plate 14. These flanges serve as fasteners for fixing the composite baffle to the inner side of a half shell of the pillar or hollow frame portion perpendicular to the longitudinal access of the hollow frame or pillar. These flanges may be adapted for spot welding. In another embodiment, the flanges 15 and 15' can be replaced by push pins or other conventional fastening means (not shown in FIG. 4).

Figure 5:
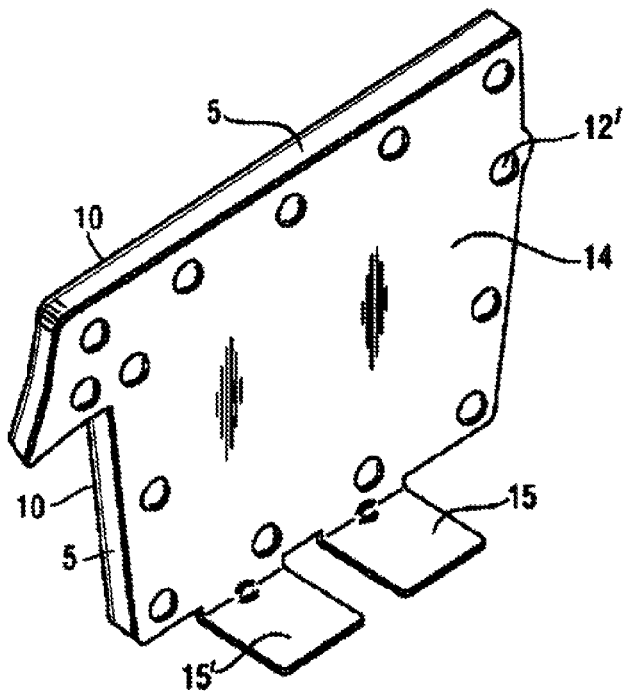
FIG. 5 is a perspective view of the assembly of FIG. 4 with the carrier and heat expandable material fixed to the plate.

FIG. 5 shows the same view of the composite heat expandable baffle as in FIG. 4 with the heat expandable sealing material 5, rigid support plate 14 and fastener flanges 15 and 15' attached to the plate. In this view, carrier 10 is "riveted" via the fixing pins 12 to the rigid carrier plate 14 by heating the protruding end points of the pins 12 thus forming a rivet like head 12'.

Figure 6:
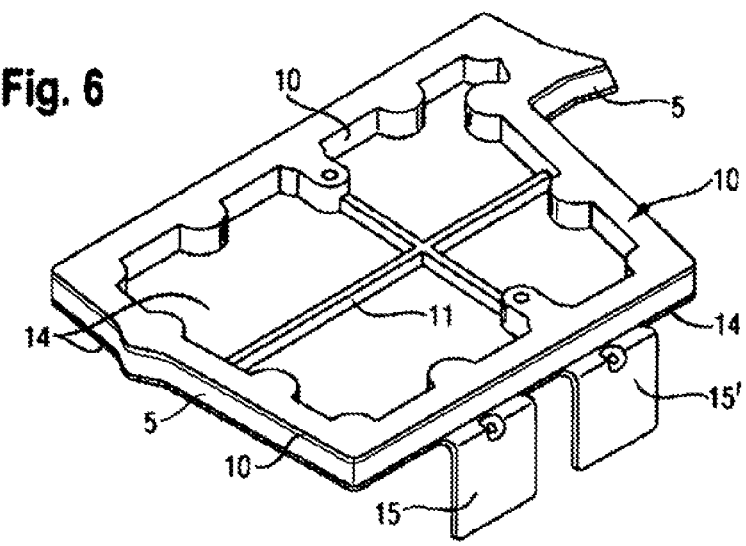
FIG. 6 shows a perspective view of the front side of an assembled heat expandable baffle according to the invention, with the carrier, the rigid support plate and heat expandable material being fixed to the plate.

FIG. 6 shows a view of the completely assembled composite baffle from the carrier side. The peripheral edge of carrier 10 is formed as an L-shaped flange which forms—together with rigid support plate 14—a U-shaped channel in which the heat expandable sealing material 5 is received. The reinforcing lattice 11 of carrier 10 is visible in the central portion of the baffle. In another embodiment, the supporting lattice 11 can be replaced by a solid central plate section of the carrier thus forming—together with the rigid support plate 14—a double walled, air filled central cross section of the baffle. The welding flanges 15 and 15' can also be seen at the lower edge of the baffle in FIG. 6.

The cross sectional shape of the composite baffle will be adapted to the cross section of the pillar or hollow frame element, whereby, in the unexpanded and uncured form, the cross section of the baffle carrier plus heat expandable material is smaller than the cross sectional opening of the hollow frame element or pillar, thus leaving a gap 7 between the unexpanded baffle and the inner surfaces of the pillar or hollow frame element. This allows the process fluids like degreasing fluids, phosphating fluids and electro coat paint (E coat) to flow freely through the hollow frame elements or pillars and wetting their inner walls completely. The heat expandable polymer composition is preferably activated in the E-coat oven (sometimes also referred to as "body-shop oven") during the curing of the electro coat. The temperature of this heating step is below 200° C., preferably between 130° C. and 180° C. At this point, the heat expandable ribbon 5 expands radially around the perimeter of the baffle, cures and adheres securely to the inner surfaces of the walls of the hollow frame elements or pillars, thereby effectively sealing these hollow elements.

The efficiency of an activated cavity filler insert can be measured using the normal Sound Transmission Loss (TL), which corresponds to the ratio of the incident acoustic power "$P_{inc}$" inside the cavity up-stream of the insert divided by the radiated power "$P_{rad}$" down-stream of the insert. The Sound Transmission Loss is expressed in dB:

$$TL = 10 \log\{P_{inc}/P_{rad}\}$$

Inserts which have a higher TL value are more efficient in dampening sound.

The lowest TL value (minimum value) is observed at the first vibration resonance of the insert. This low value can be close to 0 dB, which means no sound insulation around this frequency. The objective of the present invention is to avoid this weakness by increasing the TL at this specific frequency range.

Figure 7:
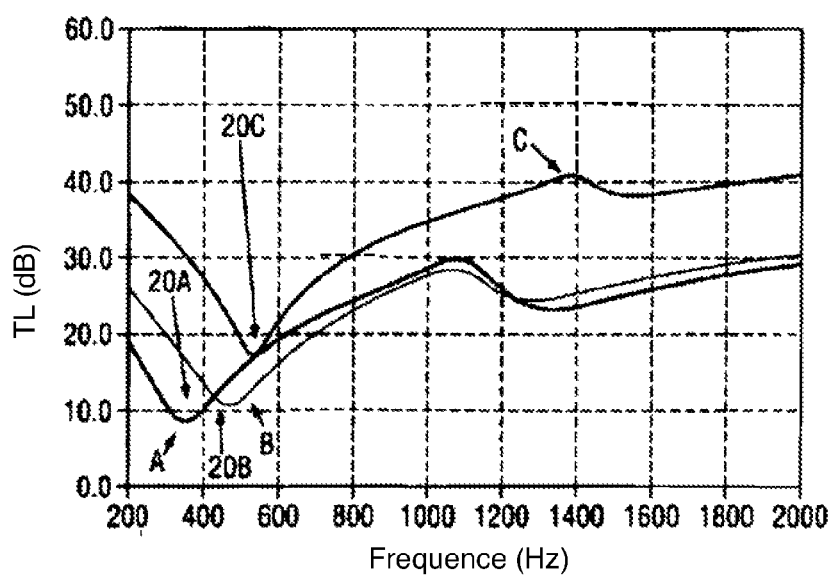
FIG. 7 displays the sound transmission loss (TL) depending on the type of the heat expandable baffle construction.

The sound transmission loss (TL) over the frequency of the various baffles is shown in FIG. 7. The frequency responses of curves A and B represent standard baffles of the state of the art comprising a standard thermoplastic carrier based on polyamide surrounded by a heat expandable sealing material. Curve C shows the transmission loss over the frequency range for the composite baffle according to the present invention. The TL deep ("trough" or minimum value) of the baffles of the state of the art is located at a low frequency around 300 to 500 Hz. This corresponds to the resonance frequency of the first vibration mode. With the rigid carrier plate of the barrier according the present invention, the resonance frequency of the first vibration mode is shifted to higher frequencies and the sound transmission loss significantly improved by about 15 dB.

In addition to the improved transmission loss, the composite baffles of the present invention have the following advantages:
- better expansion of the expandable material due to the U-shaped curve receiving the expandable sealing material,
- compared to the standard concept of a steel carrier with an attached plate of the expandable sealing material, less of the cost of the expandable sealing material is required,
- the composite baffles of the present invention can, be easily manufactured by automatic assembly processes, moreover, also the placement of the baffles in the hollow cavities can be carried out by automatic processes with the aid of robots.

What is claimed is:

1. A process for sealing a cavity of a vehicle body at a predetermined cross section of a cavity defined by cavity walls, the process comprising:
   a) providing a heat expandable baffle comprising:
      (1) a rigid support plate with a shape corresponding to, but smaller than the shape of the cross section of the cavity,
      (2) a carrier, for a heat expandable material, having a peripheral edge formed as an L-shaped flange extending outward and equipped with integrally molded pin-like fastening devices, and
      (3) a heat expandable material, adapted to expand at a temperature in an activation temperature range, mounted only to the outer periphery of the carrier, the pin-like fastening devices protruding through the heat expandable material,
   said carrier is fixed via the pin-like fastening devices to the rigid support plate, and the heat expandable material, when activated, expands radially from the carrier to seal the cross section of the cavity between the carrier and the cavity wall defining the cross section;
   b) mounting the rigid support plate to one of the cavity walls in a transverse orientation to said wall and leaving a small peripheral space between the heat expandable material and the cavity walls,
   c) heating the heat expandable material to said temperature in said activation temperature range, thereby causing the heat expandable material to expand and seal the peripheral space between the carrier and the cavity walls.

2. The process for sealing a cavity of a vehicle body according to claim 1 wherein the heat expandable material and the carrier are formed by injection molding.

3. The process for sealing a cavity of a vehicle body according to claim 1 wherein the temperature of the heating step c) is below 200° C.

4. The process for sealing a cavity of a vehicle body according to claim 1 wherein the heat expandable material is integrally molded to the outer periphery of the carrier.

5. The process for sealing a cavity of a vehicle body according to claim 1 wherein the rigid support plate and the carrier form a radial groove in which the heat expandable material is received.

6. The process for sealing a cavity of a vehicle body according to claim 1 wherein the rigid support plate includes at least one fastening device for securing the rigid support plate to the inner side of one of the cavity walls.

7. The process for sealing a cavity of a vehicle body according to claim 1 wherein the pin-like fastening devices are adapted to form rivet-like heads.

8. The process for sealing a cavity of a vehicle body according to claim 1 wherein the rigid support plate is made of polyamide or sheet metal, said sheet metal being selected from steel, galvanized steel, aluminum and aluminum alloys.

9. The process for sealing a cavity of a vehicle body according to claim 6 wherein the at least one fastening device for securing the rigid support plate to the inner side of one of the cavity walls is a pushpin device or is adapted for welding.

10. The process for sealing a cavity of a vehicle body according to claim 1 wherein the carrier is made of polyamide.

11. The process for sealing a cavity of a vehicle body according to claim 10 wherein the polyamide contains fibers.

12. The process for sealing a cavity of a vehicle body according to claim 1 wherein the heat expandable material comprises an ethylene-copolymer, a blowing agent, a tackifier, an additive polymer or oligomer and crosslinking agent.

13. The process for sealing a cavity of a vehicle body according to claim 1 wherein the carrier further comprises a solid central plate section forming together with the rigid support plate a double walled air filled central cross section of the baffle.

* * * * *